(12) United States Patent
Morris (10) Patent No.: US 9,881,170 B2
(45) Date of Patent: Jan. 30, 2018

(54) DBFS PERMISSIONS USING USER, ROLE, AND PERMISSIONS FLAGS

(71) Applicant: Oracle International Corporation, Redwood Shores, CA (US)

(72) Inventor: Michael Morris, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 441 days.

(21) Appl. No.: 14/543,658

(22) Filed: Nov. 17, 2014

(65) Prior Publication Data
US 2016/0140354 A1    May 19, 2016

(51) Int. Cl.
*G06F 17/30* (2006.01)
*G06F 21/62* (2013.01)

(52) U.S. Cl.
CPC .... *G06F 21/6218* (2013.01); *G06F 17/30165* (2013.01); *G06F 17/30233* (2013.01); *Y10S 707/99931* (2013.01); *Y10S 707/99933* (2013.01); *Y10S 707/99943* (2013.01)

(58) Field of Classification Search
CPC .......... G06F 21/6218; G06F 17/30233; G06F 17/30165; Y10S 707/99939; Y10S 707/99931; Y10S 707/99933; Y10S 707/99943
See application file for complete search history.

(56) References Cited

U.S. PATENT DOCUMENTS 6,308,173 B1 * 10/2001 Glasser ............. G06F 17/30221
6,813,640 B1 * 11/2004 Benson ................. G06F 9/4428
                                              707/999.009
7,036,149 B2 * 4/2006 Sonoda ............. G06F 17/30067
                                              705/308
7,185,192 B1 * 2/2007 Kahn .................. G06F 21/6218
                                              707/999.003
7,685,123 B1 * 3/2010 Thompson .............. G06F 17/30
                                              707/783
7,925,751 B1 * 4/2011 Bolinger ........... G06F 17/30067
                                              709/219

(Continued)

OTHER PUBLICATIONS

Wikipedia, "File System Permissions", from the internet http://en.wikipedia.org/wiki/File_system_permissions, last viewed on May 5, 2015, 6 pages.

(Continued)

*Primary Examiner* — Leslie Wong
(74) *Attorney, Agent, or Firm* — Hickman Palermo Becker Bingham LLP (57) ABSTRACT

A method for authenticating file operations on files and folders stored in a database file system where the database file system can authenticate a client-user request based upon the client-user's database credentials. The database file system has the capability of storing file permissions based on database credentials. Once a client requests a certain file operation, the client's operating system first determines whether the client has sufficient privileges to perform the requested file operation. If the client has privileges, the client operating system forwards the file operation request to the database file system. The database file system then authenticates the client, based on his database credentials, to determine whether or not to perform the requested file operation.

11 Claims, 3 Drawing Sheets

(56) References Cited

U.S. PATENT DOCUMENTS

| | | | |
|---|---|---|---|
| 2005/0223008 A1* | 10/2005 | Kubota | G06F 21/40 |
| 2006/0167979 A1 | 7/2006 | Fuchs | |
| 2006/0287999 A1 | 12/2006 | Kawabata | |
| 2007/0150525 A1 | 6/2007 | Idicula | |
| 2007/0185931 A1 | 8/2007 | Stokes | |
| 2009/0043907 A1* | 2/2009 | Peterson | G06F 3/0236 |
| | | | 709/231 |
| 2009/0319501 A1 | 12/2009 | Goldstein | |
| 2010/0242096 A1* | 9/2010 | Varadharajan | H04L 63/029 |
| | | | 726/4 |
| 2010/0325710 A1* | 12/2010 | Etchegoyen | G06F 21/31 |
| | | | 726/7 |
| 2012/0233668 A1* | 9/2012 | Leafe | G06F 9/5022 |
| | | | 726/4 |
| 2014/0282900 A1* | 9/2014 | Wang | H04L 63/04 |
| | | | 726/4 |
| 2014/0310769 A1* | 10/2014 | O'Neill | H04L 63/10 |
| | | | 726/1 |
| 2016/0224550 A1 | 8/2016 | Morris et al. | |

OTHER PUBLICATIONS

Morris, U.S. Appl. No. 14/609,265, filed Jan. 29, 2015, Interview, dated Aug. 2, 2017.

Morris, U.S. Appl. No. 14/609,265, filed Jan. 29, 2015, Final Office Action, dated Sep. 8, 2017.

\* cited by examiner

DBFS PERMISSIONS USING USER, ROLE, AND PERMISSIONS FLAGS

CROSS-REFERENCE TO RELATED APPLICATIONS

This application is related to provisional Application Ser. No. 60/147,538 filed on Aug. 5, 1999 entitled "Internet File System", by Eric Sedlar, the entire disclosure of which is hereby incorporated by reference as if fully set forth herein.

FIELD OF THE INVENTION

The present invention relates to providing a more granular level of security to a database file system to check client permissions on a per request basis.

BACKGROUND

Database communities have used databases to store files closely associated with database applications including CAD, medical images, invoice images, and other documents. A database provides security, ability to search, and scalability over traditional file systems. A database file system (DBFS) leverages the features of a database to store files, and the strength of a database to efficiently manage relational data. The DBFS provides a client-server file system abstraction over files stored in a database allowing users to perform network file system operations within the database using standard file system interfaces instead of standard database interfaces. Similar to a Network File System (NFS), the DBFS provides a transparent abstraction layer of a shared network file system as a local file system to a client user.

The Database Management System (DBMS) is the file system server for DBFS. A DBFS Client provides a set of interfaces that transform file system operation requests from the client to database operation requests, which are then sent to the DBMS.

The DBFS file system is mounted on a client machine at a client-specific mount point. File system operation requests from a client-user that are relative to the client-specific mount point are translated by the DBFS Client to their corresponding database operation requests and sent to the DBMS. Before mounting the DBFS file system on the client machine, the DBFS Client authenticates the client-user based on their database credentials. Once authorized, the DBMS transmits information for each of the requested files stored in the DBFS file system. This information includes: the file owner, the group, and the permission values originally set by the system where the file was last updated or created.

When the client-user performs a file operation request on a file stored within the DBFS file system, the following operations occur. The client machine determines whether the client-user has sufficient privileges to perform the requested file operation. This determination is performed by the client machine's operating system. If the client-user at the operating system level does not have permission then the operating system denies the request. If the client-user has sufficient privileges, then the client's operating system passes the request to the DBFS Client. The DBFS Client then translates the client-user's operating system file operation request into a database request. The database request is passed to the DBMS, which performs the database request. The user then receives the output of the database request via the DBMS, and DBFS client.

One potential issue with the DBFS is the manner in which information about user access privileges is generated by the DBFS. The DBFS file system stores, in association with a file and directory, user access control information provided by the DBFS client system, which created or updated the file. Client-user identifiers are generated locally on the client machine of each DBFS Client. There is a possibility that a client-user ID overloading scenario may occur. A client-user ID overloading scenario occurs when one client-user on a machine has the exact same client-user identifier as another client-user on another machine. In this scenario, the determination of a client-user's privileges for a file may be based on the client-user identifier of another client-user. Permissions may be mistakenly granted to client-users for file operations that do not actually have sufficient privileges. An illustration of this when a file is created by client-user A on client server A and saved in the mounted DBFS file system, the DBFS stores the created file (file-A) and its associated file information from client server A. This means that the stored file information includes the file owner as user ID 100, where the client-user A is locally known as user ID 100. Then when client-user B on client server B, where client-user B is locally known as user ID 100, tries to perform a file operation on file A; the client server B will compare client-user B's user ID value (locally known as 100) to the file information retrieved from the DBFS file system. When the file owner information for file A is compared to client-user B's user ID value, the client server B will mistakenly conclude that client-user B is the file owner for file-A because of the overlapping user IDs. Thus a client-user ID overloading scenario occurs.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches are provided herein for a database file system (DBFS) to authorize Database-side file access control for a client file operation request on a per request basis. In the approaches a remote client machine initially performs Client-side operating system authorization on the client file operation request.

Once the client file operation is authorized by the Client-side operating system, the DBFS performs Database-side file access control using a client-user's previously established database credentials with the DBMS. This additional determination is made by the DBFS even though the client-side operating system has authorized the client file operation.

The DBFS is configured to store file information for each file, specifying the owner of the file, authorized roles, and type of permissions authorized for the file owner, authorized roles, and other database users. This approach of authentication determines Database-side file access control based upon the stored file information for each file and the client's database credentials.

The client-user is a user on a remote client machine. The client-user can select a specific mount point within the client file system using the DBFS Client. The client-user can mount the DBFS file system at a specific mount point within the client file system. The DBFS Client uses the client-user's database credentials to access the DBMS and mount the DBFS file system stored in the database to a specific folder on the client system. Once mounted, the client sees the files and directories from the database as if they were part of the client's native file system. Subsequent client file operation requests are first authorized by the Client-side operating system, and additionally authorized by the DBFS to determine Database-side file access control for the specific file operation requested.

Database File System Architecture

Figure 1:
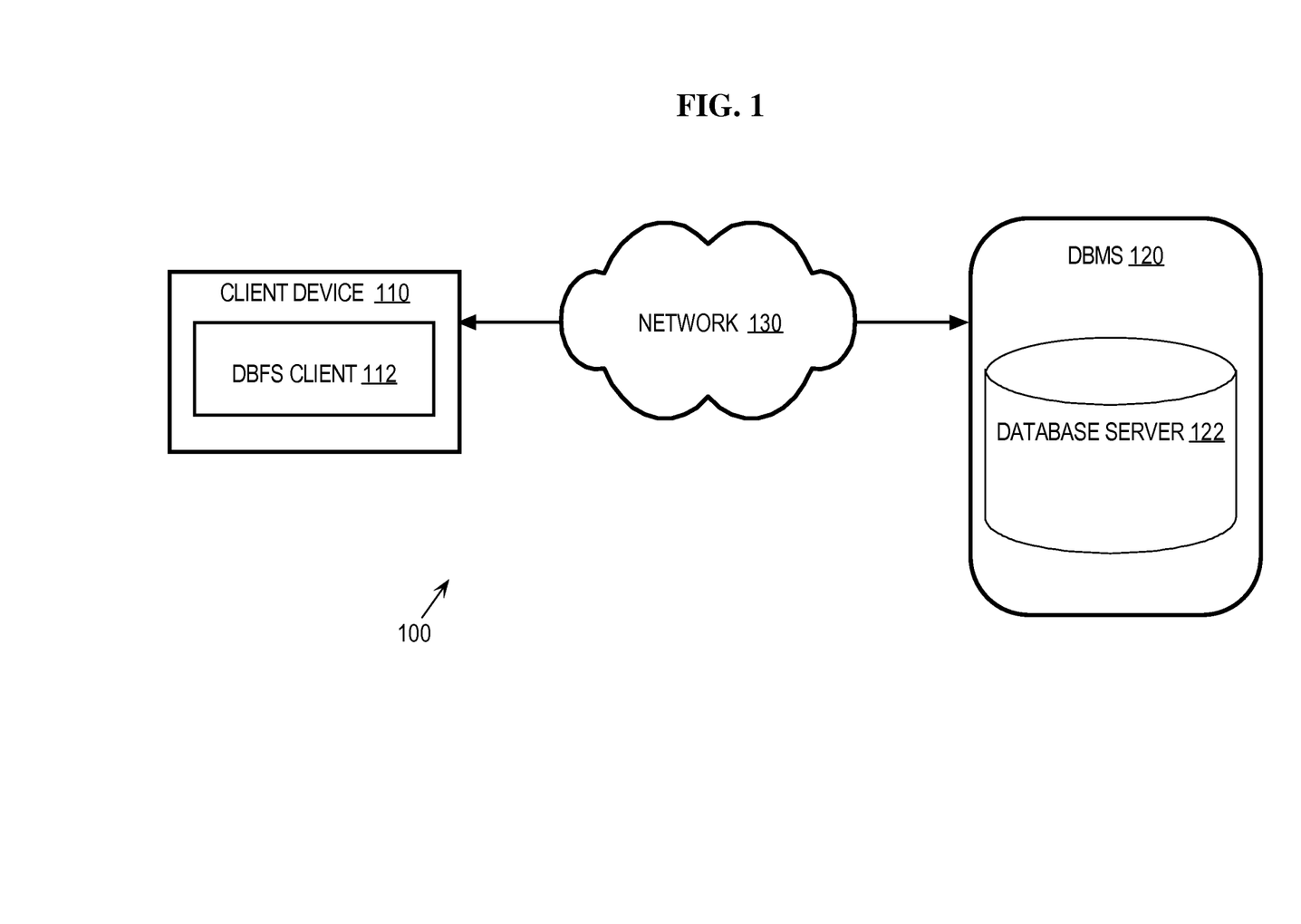
FIG. 1 is a block diagram that depicts an example network arrangement for a database file system to authenticate file operation requests from a client system.

FIG. 1 is a block diagram that depicts an example network arrangement 100 for the DBFS to authenticate file operation requests from the client based upon the client's database credentials, according to embodiments. Example network arrangement 100 includes a client device 110 and a DBMS 120 communicatively coupled via a network 130. An example network arrangement 100 may include other devices, including multiple client devices and multiple server devices, according to embodiments.

The client device 110 may be implemented by any type of computing device that is communicatively connected to network 130. Example implementations of the client device 110 include, without limitation, workstations, personal computers, laptop computers, personal digital assistants (PDAs), tablet computers, cellular telephony devices such as smart phones, and any other type of computing device.

In the example network arrangement 100, the client device 110 is configured with a DBFS Client 112. The DBFS Client 112 may be implemented in any number of ways, including as a stand-alone application running on the client device 110. The DBFS Client 112 may be implemented by one or more logical modules. The client device 110 may be configured with other mechanisms, processes and functionalities, depending upon a particular implementation to interact with the DBFS Client 112.

The DBMS 120 is the file system server for the DBFS. An example of the DBMS 120 is described in the DBMS OVERVIEW section below. The file system server consists of one or more file system stores that are accessed by a set of interfaces called DBFS Content API. A file system store is characterized by one or more database objects including, but not limited to, tables, table partitions, and indexes. The DBFS Content API provides database interfaces that correspond to a set file system access primitives including, but not limited to, create file, open, read, write, create directory, list directory, and change directory.

Embodiments of the DBFS Client 112 may use different mechanisms including but not limited to, the File system in Userspace (FUSE) to expose file system calls from the operating system kernel as function callbacks in user space. The DBFS Client 112 then transforms the function callbacks to the equivalent database interfaces provided by the DBFS Content API and sends the database call to the DBMS 120. Client-user file system requests that are related to the files within the DBFS file system are then converted by the operations described above.

The network 130 may be implemented with any type of medium and/or mechanism that facilitates the exchange of information between the client device 110 and the DBMS 120. Furthermore, the network 130 may facilitate use of any type of communications protocol, and may be secured or unsecured, depending upon the requirements of a particular embodiment.

Determining Client Privileges

In an embodiment of a client operating system, permissions are designated for each file and directory. Embodiments of permissions may include, but are not limited to, Portable Operating System Interface-type (POSIX) permissions whereby different levels of control are designated for the owner of the file, the members of a group of related users, and all other users. POSIX is a file system permission model used in Unix-based operating systems. The POSIX file system permission model associates, with each file, different levels of permissions for the owner, owning group, and all other users. Permissions can be assigned to read a file, to write a file, and to execute a file, or any combination thereof. File permissions are stored on disk with the data of the file. Each file on disk has two parts. An inode is the part which describes the file and data blocks are the part that actually holds the data of the file. The file permissions are contained within the inode for the file. Therefore when the client-user requests a specific file operation on a particular file, the client operating system references the particular inode for that particular file to determine whether the client-user has privileges to perform the requested operation.

In the case of a mounted remote file system, when the client machine mounts a remote file system, the remote file system returns to the client machine a superblock. The superblock contains characteristics of the remote file system including, but not limited to, the size and location of inode tables on the remote file system. Similar to determining permissions on a locally kept file, the client operating system uses the superblock to find the particular inode for the requested file on the remote file system. Once the inode for the remote file is located, the client operating system determines whether the client-user has privileges to perform the requested operation.

Figure 2:
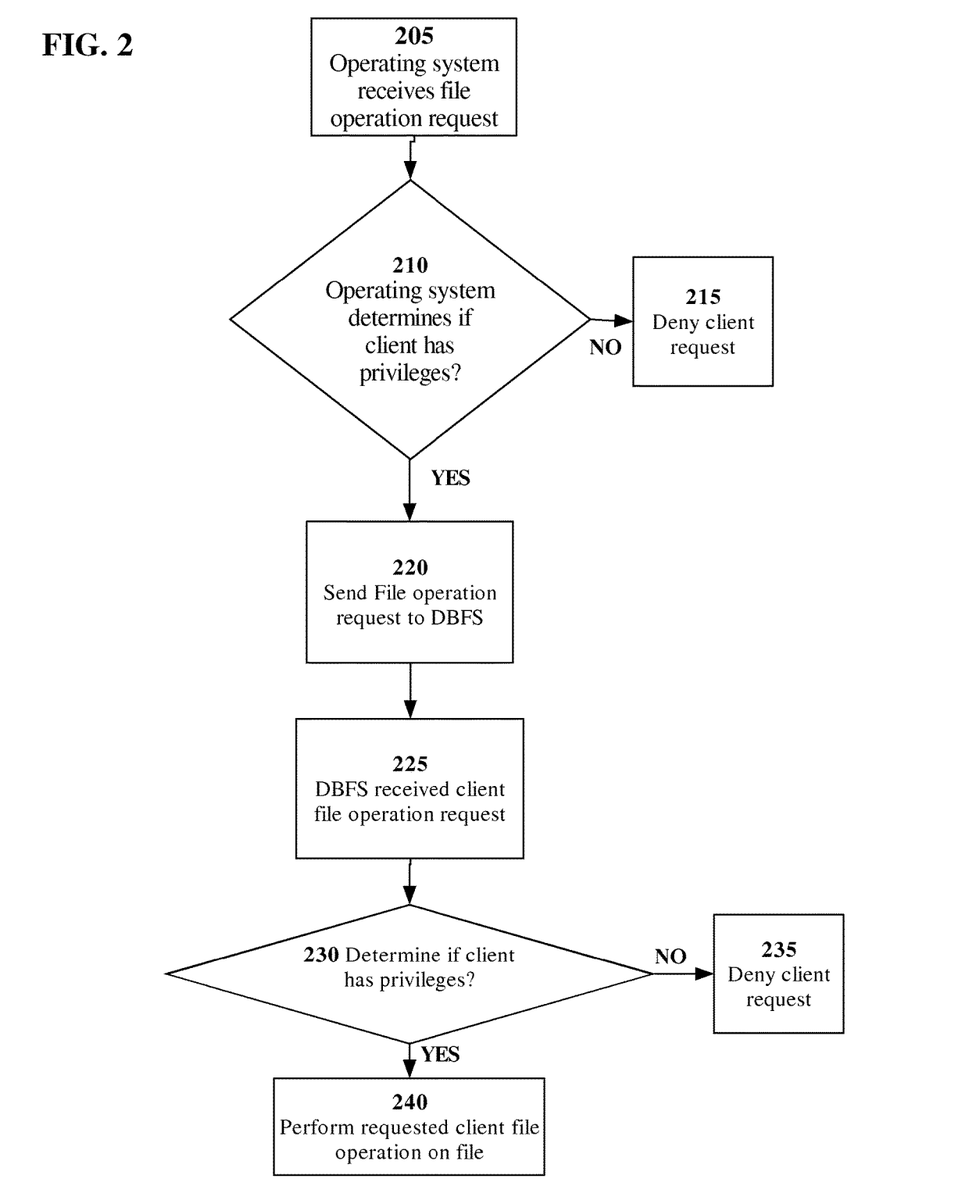
FIG. 2 is a flow diagram of the method by which the database file system determines whether the client-user has sufficient privileges to perform the requested file operation.

FIG. 2 is a flow diagram that depicts the overall process by which the DBFS determines whether the client-user has sufficient privileges to perform the requested file operation. When the client-user requests a file operation on data, such as a file or directory located in the DBFS file system, the client's operating system first determines whether the client-user has sufficient privileges to perform the requested file operation. At Step 205 the client operating system receives a file operation request from the client-user. Here, the client operating system evaluates the client-user's operating system user ID (UID). According to an embodiment, operating systems evaluate users by assigning each user an UID value (e.g. numeric value), which is locally stored. Files and directories have UID values associated with them to designate which user is the owner or which user has certain privileges. The client UID is then compared against the UID associated with the particular file or directory requested. At Step 210 client-side operating system authentication occurs when the client operating system determines whether the client-user has privileges to perform the requested file operation. This determination is based upon the file permissions retrieved by the client operating system. An embodiment of this privilege determination may include, but is not limited to, determining whether 1) the client UID matches the file owner UID associated with that particular file, 2) the client UID belongs to a group authorized to perform the requested file operation, or 3) the file permissions allow for any user to perform the requested file operation.

Step 215 depicts when the client-user does not sufficient privileges based upon the file permission data retrieved by the client operating system. Therefore the client operating system denies the client-user request and does not send the request to the DBFS client 112.

Step 220 depicts when the operating system determines that the client-user has sufficient privileges for the requested file operation. In this case, the client operating system forwards the client-user's file operation request to the DBFS client 112. At step 225 the DBFS client 112 receives the client-user operation request. The DBFS client 112 then associates the client-user's database ID to the client-user's UID.

At step 230, the DBFS determines whether the client-user, based on the client-user's database ID, has sufficient privileges to perform the requested file-operation on that particular file. This determination includes determining whether the client-user, based on client-user's database ID: 1) is the file owner, a defined in the database, 2) is assigned a specific role in the database, which gives the client-user specific privileges to perform the file operation request, or 3) the file specific privileges stored in the database for that particular file allow all database users to perform the requested file operation.

The benefit of determining privileges based on the client's database ID is that it ensures against client-user ID overloading because each client-user, regardless of their local client UID, has a unique database ID within the DBMS 120.

In one embodiment, step 230 occurs at the DBFS client 112 on the client system. The DBFS client 112 determines whether the client-user has sufficient privileges and only forwards authorized requests to the DBMS 120. In another embodiment, step 230 may occur on the DBMS 120. In this case, the DBFS client 112 would simply forward the requested file operation, along with the client-user's database ID, to the DBMS 120. The DBMS 120 would then determine whether the client-user has sufficient privileges and performs the requested file operation.

If based on the client-user's database ID, the client-user does not have sufficient privileges then the DBFS would deny the file operation request. Step 235 depicts a denial of a file operation request. In one embodiment, the denial would result in an error that is sent back to the client's operating system. If based on the client-user's database ID, the client-user does have sufficient privileges then at operation 240 the DBMS 120 performs the requested file operation.

DBFS File Operation Credentials

In order to implement database-side file access control, a DBMS stores access control information in one or more tables. In an embodiment, such access control information is stored in table referred to herein as a DBFS table. A DBFS table may include three columns, file-owner column, file-role column, and file permissions column.

The file-owner column is used to store a database ID of the owner of the file. A file-owner is initially the database user who created the file, or directory. The file-owner status may then be changed to another database user if the file-owner, or another database user with sufficient privileges to do so.

The file-role column is used to store a role associated with specific privileges for the particular file. Database roles are groups of users that are associated with particular level privileges. For instance, a database role entitled "dba_general" may include all database administrators that have a general level of access for database administration. Another role may be entitled "dba_super"; this second role may include a subset of database administrators that have a higher level of access to data than the dba_general group. In the context of the DBFS table, a database role can be associated with each file in each row. Then if a new database user joins a new department, his user ID can simply be added to the dba_general role and he would have the same permissions as all other users in the dba_general role.

The file-permissions column is used to store the permissions of database-side file access control for the file-owner, file-role, and all permissions for all other database users. In an embodiment, the file-permissions column would store a POSIX-like three-digit integer value that represents different levels of file access control for the file-owner, associated file-role, and other database users, where the first digit denotes the file-owner permissions, the second digit denotes the file-role permissions, and the third digit denotes the general permissions for all other database users.

Other embodiments of storing additional security data in the DBFS table include, but are not limited to, adding columns to designate specific groups and/or applications which may have specific access that is separate from the database user based on the type of file operation requested. This may include allowing specific programs read level access for parsing information from the stored files.

In the current embodiment, database-side file access control by default would not be enabled in order to support backward compatibility. Other embodiments may implement database-side file access control as a default for all new files created in the DBFS table. Embodiments for enabling the extra level security may include, but are not limited to, a saving option for when the user is saving the file to the DBFS to set the file-owner, file-role, and file-permissions flags. Other embodiments may include the user having the ability to set up preset preferences for enabling or disabling DBFS file operation credentials.

DBMS Overview

Embodiments of the present invention are used in the context of DBMSs. Therefore, a description of a DBMS is useful.

A DBMS 120 manages a database. The DBMS 120 may comprise one or more database servers 122. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server 122 of a DBMS 120 by submitting to the database server 122 commands that cause the database server to perform operations on data stored in a database. A user may be one or more applications running on a client computer that interact with a database server 122. Multiple users may also be referred to herein collectively as a user.

A database command may be in the form of a database statement that conforms to a database language. A database language for expressing the database commands is SQL. There are many different versions of SQL, some versions are standard and some proprietary, and there are a variety of extensions. DDL commands are issued to a database server 122 to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server 122. A server, such as a database server 122, is a combination of integrated software components and an allocation of computational resources, such as memory, a node, and processes on the node for executing the integrated software components on a processor, the combination of the software and computational resources being dedicated to performing a particular function on behalf of one or more clients.

A database is defined by a database dictionary. The database dictionary contains metadata that defines database objects physically or logically contained in the database. In effect, a database dictionary defines the totality of a database. Database objects include tables, columns, data types, users, user privileges, and storage structures used for storing database object data.

The database dictionary is modified according to DDL commands issued to add, modify, or delete database objects. For example, in response to receiving a DDL statement to create table person, a database server alters metadata in a database dictionary to define table and its columns. A database dictionary is referred to by a DBMS 120 to determine how to execute database commands submitted to a DBMS 120. Thus, when a DML statement is received by a database server 122 to insert rows with a value in a sparse column, the database server 122 consults the database dictionary to determine that the column is sparse and stores that values.

A DBMS 120 receives queries issued against a database object managed by a database system. A query optimizer associated with the database system may generate one or more different candidate execution plans for a query, which are evaluated by the query optimizer to determine which execution plan should be used to compute the query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
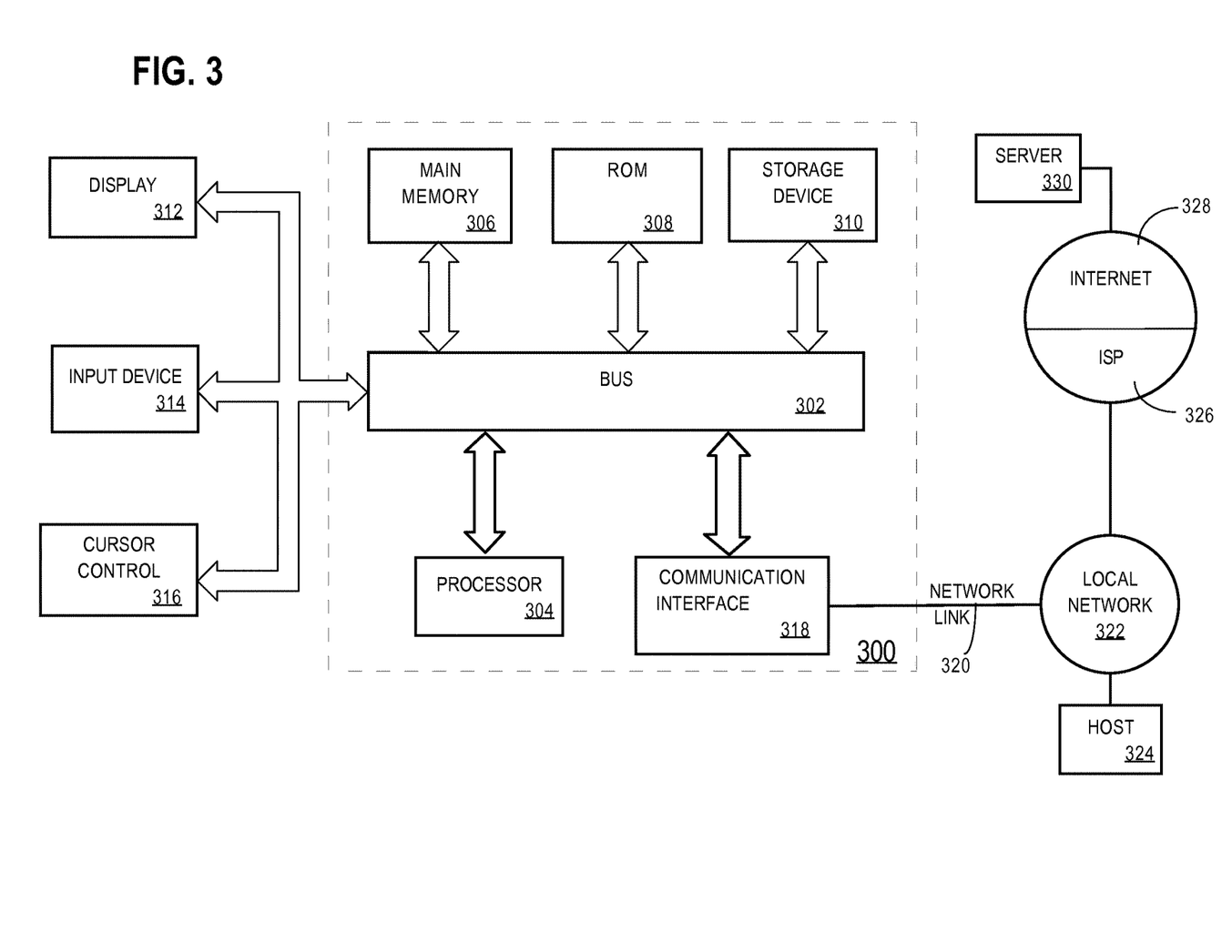
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Benefits of Certain Embodiments

In an embodiment, a solution as described herein improves file security for files and folders stored in a database file system. Current file operation requests on files stored in a database file system are susceptible to file owner identifier overlaps. When the remote client system locally authenticates a client's user ID against the stored file owner user ID for a particular file, there is a possibility that the user ID value may overlap. In this scenario, the user ID value overlap will cause the remote client system to erroneously determine that the client is the file owner. Thereby breaching file system security.

This solution adds a second layer of client authentication based on the client's database credential. By using database credentials over locally stored user IDs, the possibility of user ID overlap is eliminated. Thereby ensuring that authorized users only perform file operation requests on files stored in the database file system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   an operating system running on a client machine, receiving a request for a file operation on a specific file within a database file system that stores files in database objects of a database system;
   in response to receiving said request:
   said operating system determining whether a user associated with said request has a privilege required for said file operation for said specific file;
   wherein said operating system determining whether said user has said privilege required for said file operation includes comparing an operating system user ID of said user to metadata associated with said specific file, wherein said operating system user ID is stored locally on said client machine, wherein said metadata contains privilege information, based on operating system user IDs, for file operations associated with said specific file;

when said operating system determines that said user has said privilege, said database system determining whether said user has said privilege required for said file operation on said specific file, based upon a database user ID associated with said user; and in response to said database system determining that said user has said privilege required for said file operation for said specific file, said database system permitting said file operation on said specific file.

2. The method of claim 1, wherein said request is a second request, and the method further comprises the steps of:

prior to receiving said second request, receiving, at said database file system, a first request to establish a connection using said database user ID associated with said user for said user to said database file system; and said database system determining whether said user has said privilege required for said second request comprises evaluating said database user ID associated with said user.

3. The method of claim 2, wherein said database system determining whether said user has said privilege required for said second request comprises evaluating a role set for said user in said database file system.

4. The method of claim 2, wherein said database system determining whether said user has said privilege required for said second request comprises evaluating specific privileges maintained in said database file system set for said specific file.

5. The method of claim 1, the method further including the step of updating privileges required for said file operation for said specific file by changing a database user ID associated with said specific file within said database file system.

6. A system for determining file operation permissions on a database system for a user, the system comprising:

a client computer system configured to receive a request for a file operation on a specific file within a database management system that stores files in database objects of the database system;

a client operating system configured to determine whether said user associated with said request has a privilege required for said file operation for said specific file;

wherein said client operating system determines whether said user has said privilege required for said file operation includes comparing an operating system user ID of said user to metadata associated with said specific file, wherein said operating system user ID is stored locally on said client computer system, wherein said metadata contains privilege information, based on operating system user IDs, for file operations associated with said specific file;

said database management system configured to determine whether said user has said privilege required for said file operation on said specific file, based upon a database user ID associated with said user, when said client operating system determines that said user has said privilege; and said database management system configured to permit said file operation on said specific file in response to said database system determining that said user has said privilege required for said file operation for said specific file.

7. One or more non-transitory storage media storing instructions which, when executed by one or more computing devices, causes:

an operating system running on a client machine, receiving a request for a file operation on a specific file within a database file system that stores files in database objects of a database system;

in response to receiving said request:

said operating system determining whether a user associated with said request has a privilege required for said file operation for said specific file;

wherein said operating system determining whether said user has said privilege required for said file operation includes comparing an operating system user ID of said user to metadata associated with said specific file, wherein said operating system user ID is stored locally on said client machine, wherein said metadata contains privilege information, based on operating system user IDs, for file operations associated with said specific file;

when said operating system determines that said user has said privilege, said database system determining whether said user has said privilege required for said file operation on said specific file, based upon a database user ID associated with said user; and in response to said database system determining that said user has said privilege required for said file operation for said specific file, said database system permitting said file operation on said specific file.

8. The one or more non-transitory computer-readable media of claim 7, wherein said request is a second request, wherein said instructions include instructions for prior to receiving said second request, receiving, at said database file system, a first request to establish a connection using said database user ID associated with said user for said user to said database file system; and said database system determining whether said user has said privilege required for said second request comprises evaluating said database user ID associated with said user.

9. The one or more non-transitory computer-readable media of claim 8, wherein said database system determining whether said user has said privilege required for said second request comprises evaluating a role set for said user in said database file system.

10. The one or more non-transitory computer-readable media of claim 8, wherein said database system determining whether said user has said privilege required for said second request comprises evaluating specific privileges maintained in said database file system set for said specific file.

11. The one or more non-transitory computer-readable media of claim 7, the instructions further including instructions for updating privileges required for said file operation for said specific file by changing a database user ID associated with said specific file within said database file system.

* * * * *